United States Patent [19]

Baer et al.

[11] 4,109,114
[45] Aug. 22, 1978

[54] PROGRAMMABLE PHONOGRAPH DEVICE

[75] Inventors: Ralph H. Baer, Manchester, N.H.; Donald K. Fletchic, Arlington Heights, Ill.

[73] Assignee: Marvin Glass & Associates, Chicago, Ill.

[21] Appl. No.: 705,138

[22] Filed: Jul. 14, 1976

[51] Int. Cl.² ............................................. G11B 19/14
[52] U.S. Cl. ..................... 179/100.4 D; 179/100.4 A; 179/100.3 V; 250/214 B; 250/570; 360/72; 274/15 R
[58] Field of Search ................. 179/100.4 D, 100.4 A, 179/100.4 R, 100.3 V, 100.1 PS, 100.41 L; 250/214 B, 570; 360/72, 78, 86; 274/15 R, 47, 23 R

[56] References Cited

U.S. PATENT DOCUMENTS

| | | | |
|---|---|---|---|
| 2,952,464 | 9/1960 | Stimler | 179/100.4 D |
| 3,368,080 | 2/1968 | Nakagiri | 274/15 |
| 3,429,580 | 2/1969 | Hammond | 274/15 R |
| 3,661,397 | 5/1972 | Worth | 274/15 R |
| 3,867,628 | 2/1975 | Brown | 250/214 B |
| 3,937,903 | 2/1976 | Osann | 179/100.4 D |

*Primary Examiner*—Bernard Konick
*Assistant Examiner*—Alan Faber
*Attorney, Agent, or Firm*—Mason, Kolehmainen, Rathburn & Wyss

[57] ABSTRACT

The present invention comprises an improvement in programmable phonograph record players which provide automatic sound track selection of the recorded portions of a record. The improvements comprise the provision of an optical scanner mounted on the tone arm including an incandescent light source for directing visible light onto the record surface and a photodetector for receiving light reflected by the record surface. In an alternate embodiment, a differential sensor system includes a light emitting diode and a pair of photodetectors for detecting the presence of a highly reflective, unrecorded land area between two successive recorded sound track portions of the record. In another embodiment, the scanner includes a pair of alternately illuminated light emitting diodes and a single photodetector for receiving the light energy, directed by the light emitting diodes onto the record surface, reflected toward the photodetector. An auxiliary tone arm lift and sweep mechanism is controlled by a digital logic system connected to the scanner to move the tone arm in a position to play a preselected number of sound track bands as dictated by a programmable memory.

9 Claims, 9 Drawing Figures

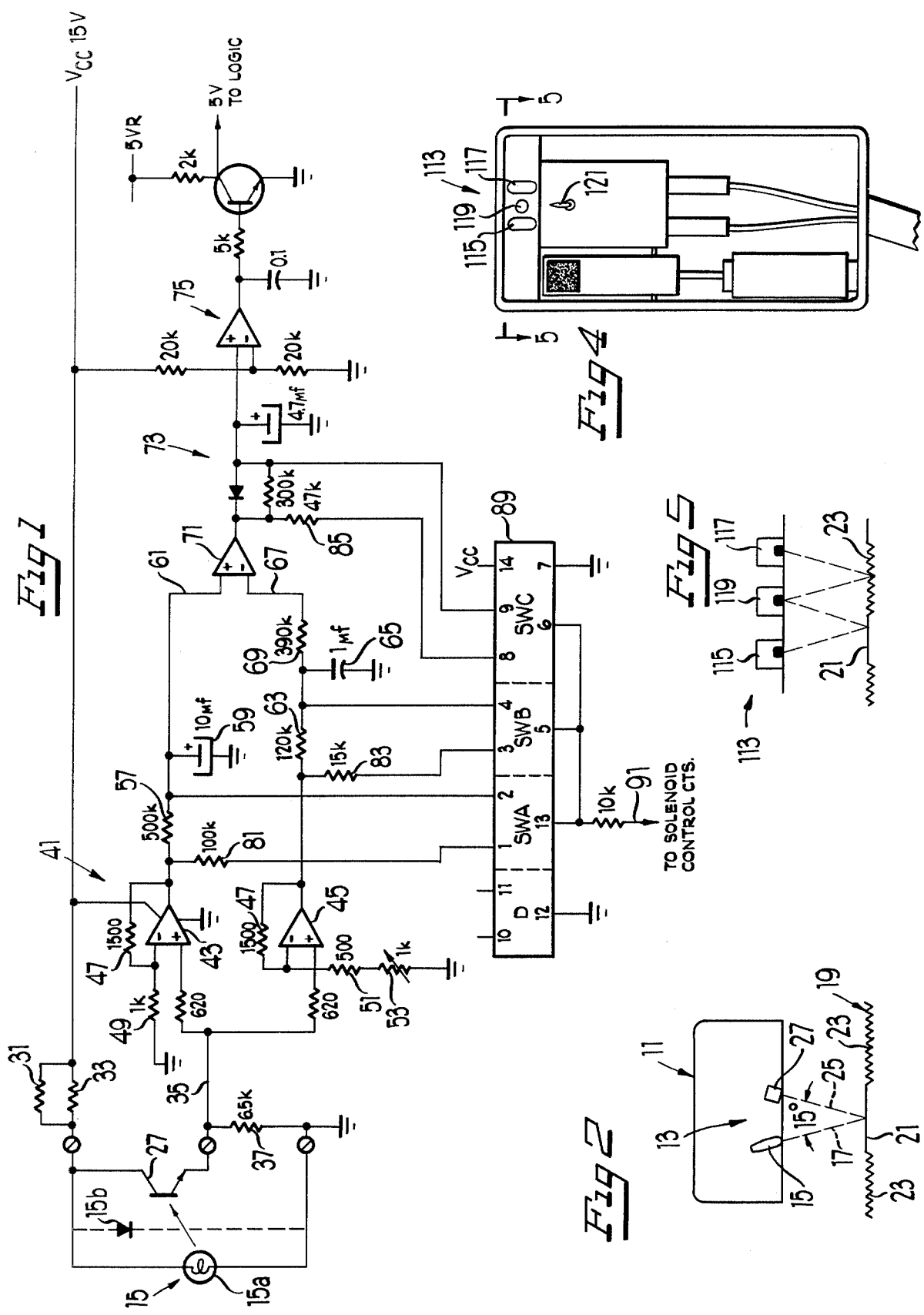

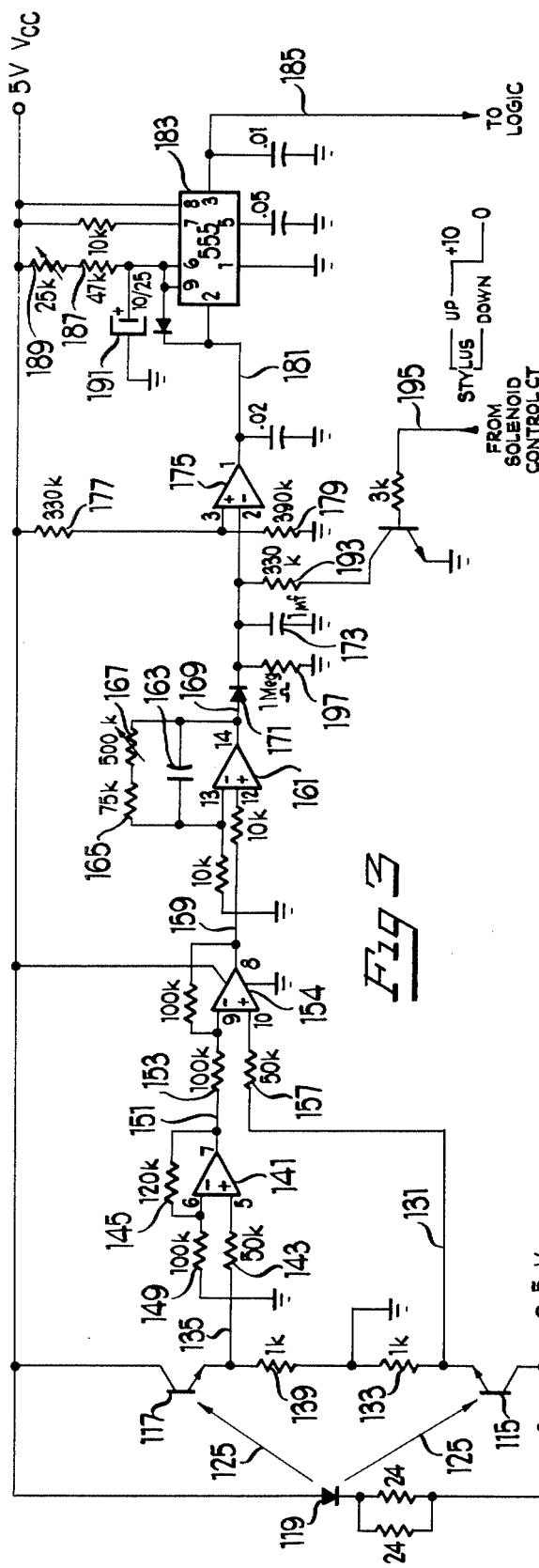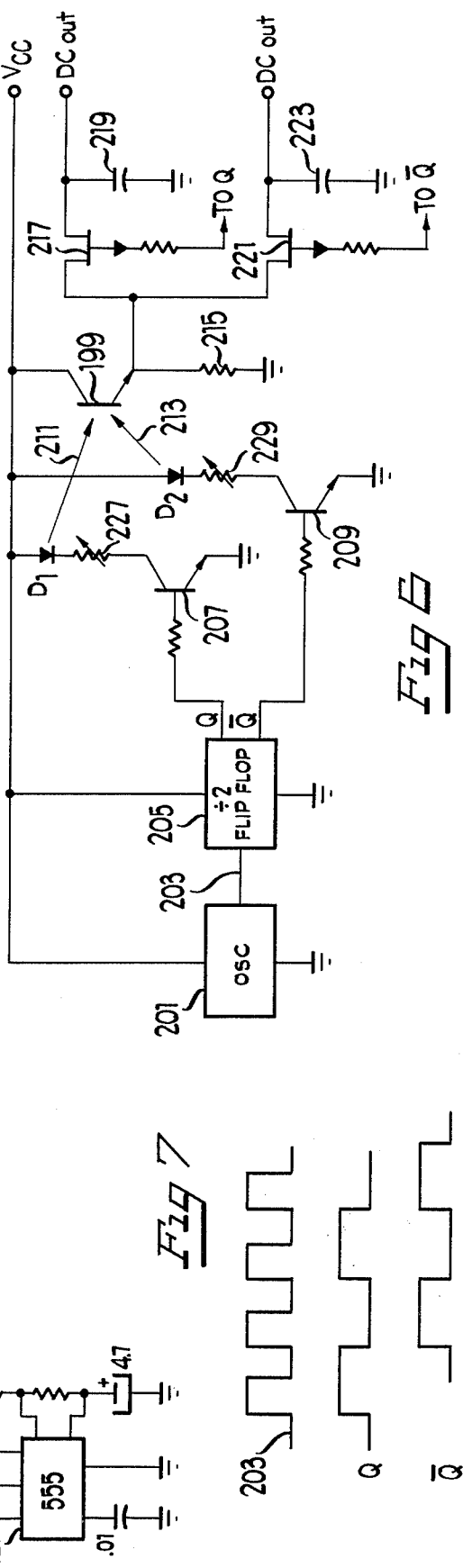

PROGRAMMABLE PHONOGRAPH DEVICE

BACKGROUND OF THE INVENTION

1. Field of the Invention

The present invention comprises an improvement in programmable phonograph record turntables and changers such as that shown and described in copending patent application Ser. No. 682,079 filed Apr. 30, 1976 and assigned to the assignee of the present invention and relates, in particular, to improvements in the record land detecting systems of such devices.

2. Brief Description of the Prior Art

Most musical recordings are sold in the form of disc-type photograph records where a plurality of sound track selections are spaced apart by unrecorded land areas which include an unrecorded groove to carry the stylus to the next sound track selection. Often a user of this type of phonograph record will want to hear fewer than all of the sound track selections on a particular record. Various record players have been proposed which are designed to permit a user to select a certain number of sound tracks to be played. The known prior art devices include U.S. Pat. Nos. 2,952,464 to Stimler, 3,368,080 to Nakagiri and 3,937,903 to Osann. It has been found that the amount of light which will be reflected by a particular unrecorded land area will vary greatly from record to record and even between proximate areas of the same sound track. Thus, there is a need for greater reliability in programmable phonograph devices and the present invention is directed toward such a device.

SUMMARY OF THE INVENTION

An object of the present invention is to provide an improved sound track selector for permitting preprogrammed selection of any of several bands of a record.

Another object of the invention is to provide an improved sensor system for detecting the presence of an unrecorded land area beneath the phonograph stylus.

In accordance with the above and other objects, the present invention provides a simplified adaptive threshold land sensor including an incandescent light source in combination with a phototransistor. In an alternate embodiment, the sensor system comprises a differential or balanced system in which a pair of photodetectors are mounted on either side of the light source for comparing the reflectivity of the record surface between two points to indicate the presence of a land area. In another design, a pair of alternatingly pulsed light emitting diodes are mounted on either side of a single phototransistor to again measure the reflectivity between two positions on the record surface to locate the presence of a land area. The above embodiments are therefore capable of reliably indicating the presence of a particular unrecorded land area beneath the sound stylus regardless of condition or other physical characteristics of the record surface.

Other objects, features and advantages of the invention will be apparent from the following detailed description taken in connection with the accompanying drawings.

BRIEF DESCRIPTION OF THE DRAWINGS

FIG. 1 is an electrical schematic diagram made in accordance with the concepts of the present invention;

FIG. 2 is a partially fragmented end view of the phonograph tone arm showing the relative mounting positions of the sensor components of the present invention;

FIG. 3 is an electrical schematic diagram of an alternate embodiment of the present invention;

FIG. 4 is a bottom view of the stylus end of the phonograph tone arm made in accordance with the alternate embodiment;

FIG. 5 is a vertical section taken generally along line 5—5 of FIG. 4 showing the respective mounting positions of the sensor elements of the alternate embodiment;

FIG. 6 is an electrical schematic diagram of yet another embodiment of the sensor made in accordance with the present invention;

FIG. 7 is a diagrammatic illustration showing the wave form of various signals in the electrical circuit of FIG. 6;

DESCRIPTION OF THE PREFERRED EMBODIMENT

Figure 8:
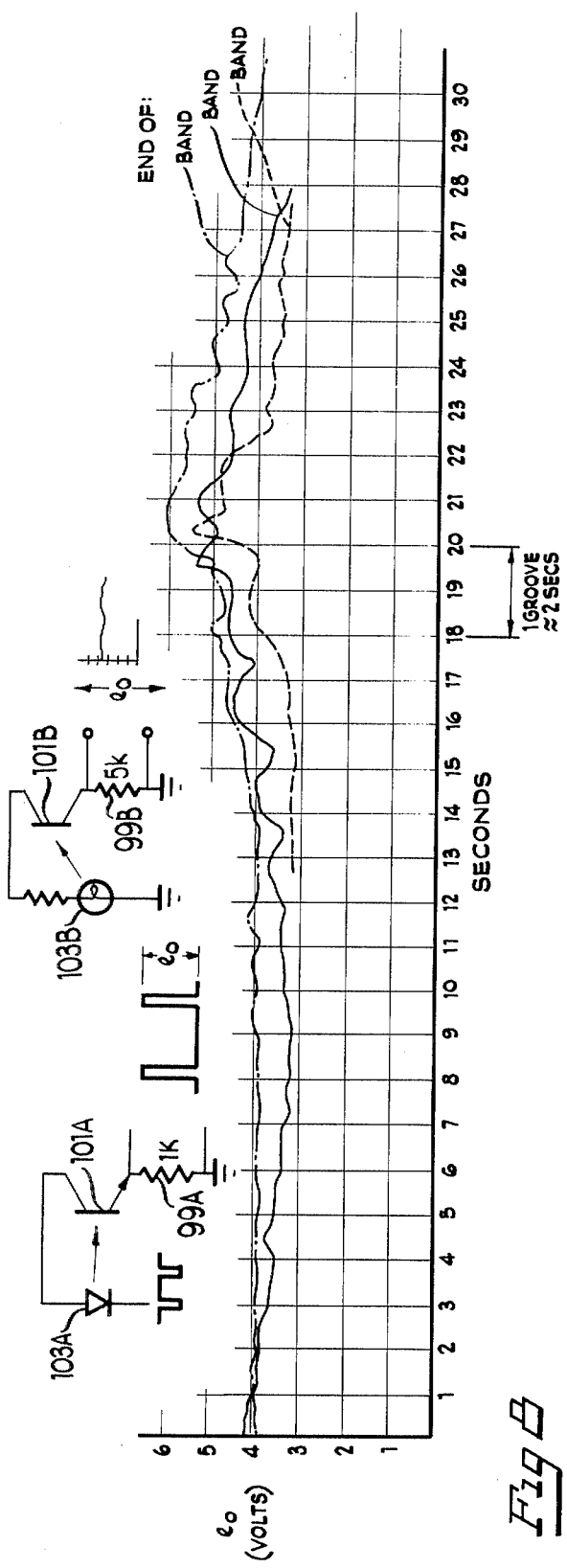
FIG. 8 is a diagrammatic illustration representing the reflectivity of various portions of a record surface while the stylus is tracking a groove.

The present invention is an improvement in programmable phonograph record turntables and changers such as that shown in copending patent application Ser. No. 682,079 filed Apr. 30, 1976, and assigned to the assignee of the present invention. That application discloses all of the mechanical and electronic elements of a programmable phonograph record changer and is incorporated herein by reference. Where appropriate, various references will be made to the specific reference numerals and elements of the above application. The present disclosure is to be considered an exemplification of the principles of the invention and is not intended to limit the invention to the embodiments illustrated.

FIG. 2 is a front elevational view of the end of a phonograph tone arm, generally designated 11, similar to FIG. 8 of the above incorporated application, showing an optical scanner or sensor, generally designated 13. The optical scanner includes a light source 15 in the form of a miniature incandescent lightbulb 15a having a generally tubular envelope or a light emitting diode 15b. Miniature bulbs of this type are commonly referred to as grain of wheat bulbs because of their obvious physical similarities. The bulb 15a is mounted at an angle of approximately 7½° with the vertical and directs a beam of light 17 onto a typical record surface, generally designated 19. As shown in FIG. 2, the axial centerline of the light rays are impinging an unrecorded land area 21 on the record surface between two adjacent recorded record sound track bands 23. The relative height of the end of the tone arm 11 with respect to the record surface 19 provides an illuminated "cue" spot on the record surface of approximately 0.05 inches in diameter. This spot provides a cuing light easily visible to the operator which illuminates the record surface in the area of the phonograph stylus. A portion of the light is reflected upwardly as shown by the line 25 to a phototransistor 27 mounted on the tone arm 11 with its axis approximately 7½° tilted from the vertical. Therefore, the angle between the emitted light 17 and the reflected light 25 will be approximately 15°. Referring to FIG. 2, the sensor operates on the principle that the amount of light reflected from the record surface 19 will be substantially higher from an unrecorded land area than from a recorded sound track portion 23. As stated above, a light emitting diode 15b of the visible or infrared light generating type may be used in place of the bulb 15a and similarly supplied with direct current through appropriate limiting resistors. A 50 milliamp DC supply has been found to suffice in a typical instance to provide adequate output from an associated phototransistor such as 27 shown in FIG. 2.

Referring to FIG. 1, the light source 15 (either the incandescent bulb 15a or the light emitting diode 15b) is shown connected to a DC supply voltage, $V_{CC}$ of approximately 15 volts which through resistors 31 and 33 energizes the incandescent light source 15a at or below one-half candle power level. The light 17 generated by the light source 15 is reflected to the phototransistor 27 connected between the terminals of the same power supply. The resultant photo current develops a voltage on line 35 across the load resistor 37. Typically, this output voltage has been found to range between 3 and 7 volts for a particular light source and phototransistor set. This wide variation in the phototransistor output illustrates the fact that the surface reflectivity can be substantially different for different disc recordings. On a particular record surface, the reflectivity of the unrecorded land areas may range from approximately 1.3 to 1.7 times the reflectivity of the recorded or grooved portion. Therefore, an adaptive threshold circuit, generally designated 41, of FIG. 1 is designed to reliably indicate the presence of a land area below the phonograph stylus. The operating principles of an adaptive threshold circuit are described with reference to FIG. 10 in the above copending application.

Referring to FIG. 1, the output of the phototransistor is applied to the non-inverting input of two feedback operational amplifier 43 and 45. The amplifiers 43 and 45 may typically be one of four operational amplifiers such as one-quarter of an LM324 standard quad op-amp. The gain of each amplifier, 43 and 45 is essentially a function of the ratio between the 1500 ohm feedback resistors 47 and the ground return resistors. In the case of amplifier 43, a 1k resistor 49 is used and in the case of amplifier 45, a 500 ohm resistor 51 is used in combination with a variable 1k resistor 53. The output of amplifier 43 is applied to an RC network including a 500k resistor 57 and a 10 micro-farad capacitor 59. The charging and discharging time constants of this network are identical and typically are of the order of 5 seconds. The output voltage on line 61 is the integral of the output of amplifier 43. Hence, the voltage on line 61 provides a reference voltage which rises and falls slowly in harmony with the average reflectivity conditions of the record area approximately two to five grooves behind the instantaneous position of the playback transducer stylus.

The output from amplifier 45 is applied to a similar RC network including a 120k resistor 63 and a 1 microfarad capacitor 65. The time constant of this network is substantially shorter, typically of approximately 0.1 second. Hence, the output on line 67 through resistor 69 represents contemporaneous or real-time surface reflectivity conditions of the area near the stylus. Line 61 is connected to the non-inverting input of an operational amplifier 71 and line 67 is connected to the inverting terminal of amplifier 71. The operational amplifier thus operates as a comparator.

Resistor 53 is adjusted to vary the gain of amplifier 45 so that its output is slightly lower than the output of amplifier 43 when the stylus is tracking a recorded or grooved portion of a record. In this case, since the non-inverting terminal of the comparator 71 is higher, the output of the comparator will be high, approximately $V_{CC}$. The small amount of integration in time delay which results in the output 67 has the attribute of eliminating all extraneous, spurious and therefore undesirable short term reflections resulting from localized imperfections on the surface of the phonograph record. However, as the sensor 13 moves above a land area 21, as shown in FIG. 2, the higher reflectivity of the land area 21 causes the voltage on 67 to exceed the voltage on 61. At this instant, when the voltage on 67 exceeds the voltage on 61, the comparator output switches from $V_{CC}$ to approximately ground or low, and remains low until such time as the voltage on 61 again exceeds the voltage on 67. This, of course, occurs after the scanner 13 moves past the land area 21 onto the next recorded surface 23. The output of the comparator 71 is applied to a signal stretcher, generally designated 73, as described in the copending application. The output of the signal stretcher 73 is applied to an inverter/comparator 75 as described in the above copending application. The output of the inverter/comparator 75 is the land area signal which is subsequently inverted by transistor $Q_3$ and input to the logic system on line 77. The five volt output logic signal on line 77 is applied to the control means 38 or logic system shown in FIGS. 11 through 18 of the above incorporated application. Thus, the adaptive threshold circuit shown and described with reference to FIG. 1 provides a reliable output which indicates the presence of a land area below the phonograph stylus.

Figure 9:
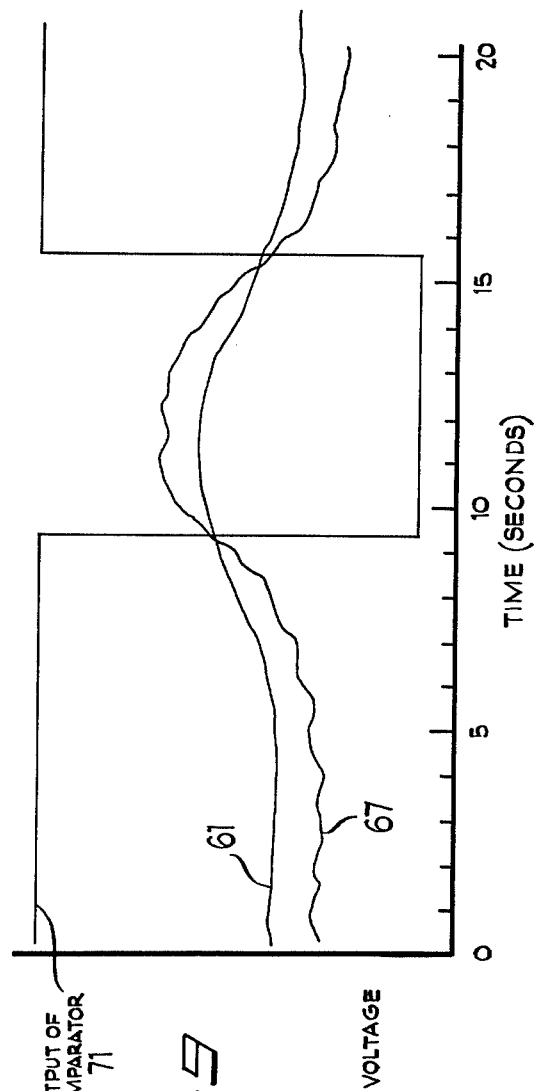
FIG. 9 is a diagrammatic illustration similar to FIG. 7 showing the signal level outut of the electrical circuit as a function of record surface reflectivity.

FIG. 9 shows diagrammatically how the adaptive thresholding is accomplished. The chart plots the voltage on lines 61 and 67 as well as the output of the comparator 71. As can be seen, during the initial period when traversing a sound track portion, the voltage on 61 is higher than that on 67, the output of the comparator 71 is high, or $V_{CC}$. However, as soon as the voltage on 67 exceeds the voltage on 61 when encountering a land area, the comparator 71 switches states and goes low until 67 is again lower than 61. The chart also shows that the long integration time provides a smooth curve on line 61 while the shorter integration time constant provides a more fluctuating voltage on line 67. In particular, the undulations shown on line 67 are the result of record warpage and are generally of the order of one or two cycles per disc rotation.

As described in the above referenced application, the phonograph tone arm traverses the record surface 19 are a much higher speed when in its sweep or traverse mode, compared to its tracking or playback mode, and therefore it is necessary to change the time constants of the respective RC networks when the phonograph is in its traverse or sweeping mode. In the sweep of traverse mode, a 100k resistor 81 is connected in parallel with the resistor 57 and a 15k resistor 83 is connected in parallel with the resistor 63 to accomplish the necessary time constant changes for the respective RC networks. Similarly, a 47k resistor 85 is connected in parallel with the 300k resistor of the signal stretcher 73. These parallel connections are effected in the circuit by three switches. The switches are designated SWA, SWB and SWC. Typically, the switches are implemented through the use of CMOS PNP/NPN semiconductor switches such as the currently available CD4066 quad CMOS switch 89 shown in FIG. 1. The switches, SWA, SWB and SWC, are made when a logic level signal of approximately $V_{CC}$ is connected to line 91 shown connected to pins 13, 5 and 6 of the quad switch 89. This signal is supplied by the solenoid driver circuits, as shown in FIG. 10 of the previous application, when the tone arm lift and traverse solenoids 112 and 122 therein are actuated. Thus, the reduction of the time constants of the RC integrator networks permits the adaptive threshold circuit 41 to operate in a much faster mode and still reliably detect the occurrence of a land area below the playback transducer stylus.

FIG. 8 is a chart constructed by measuring the output voltage across a load resistor 99A or 99B generated by a phototransistor 101A or 101B receiving reflected light from a light emitting diode 103A or an incandescent light source 103B, respectively. The chart shows portions of three different bands on a particular record, one being constructed in phantom, the other solid, and the other represented by a dash line. From the chart, it can be seen that the reflectivity of a record surface varies greatly even when the sensor is traversing a recorded or grooved portion of the record surface. The uppermost or highest voltage levels on the chart just to the right of the center of the chart represent the presence of a land area below the sensor and it can be seen that even the reflectivity of the unrecorded land area also is variable for a particular land area. This chart shows than an adaptive threshold circuit will be much superior to a circuit having a fixed threshold since the latter could not reliably indicate the presence of a land area.

In another embodiment, shown in FIGS. 3, 4 and 5, a differential or balanced system, generally designated 111 (FIG. 3), is shown. Referring to FIGS. 4 and 5, the end of the tone arm is modified to include a scanner generally designated 113 including an inner phototransistor 115, an outer phototransistor 117 and a single light emitting diode 119 between the phototransistors and on centerline with the phonograph stylus 121. The other mechanical elements of the tone arm head, and tone arm lift and traverse mechanism, are identical to those described in the above copending application. As shown in FIG. 5, the sensor 113 provides a differential reading as the tone arm moves across the record surface. Particularly, referring to FIG. 5, the inner or leading phototransistor 115 is shown as receiving light from the light emitting diode 119 which has been reflected from an unrecorded, intraband land area 21 while the phototransistor 117 is receiving light from a recorded or grooved portion 23 of the record surface. Thus, in this embodiment, the occurrence or presence of a land area will be indicated by a rapid increase in the output of the phototransistor 115 when compared to the output of the phototransistor 117. When both are receiving light reflected by the grooved portion 23, there is substantially no difference between their respective outputs.

Referring to FIG. 3, the light emitting diode 119 is shown to provide reflected light to both phototransistors as represented by the arrows 125. The light emitting diode is driven from a pair of 24 ohm resistors in parallel connected to a 555 oscillator 127. The oscillator 127 provides a rectangular wave form output for pulsing the light emitting diode 119 with a duty cycle of approximately 15%. The light from the pulsed light emitting diode 119 is reflected to the two phototransistors 115 and 117 which have been matched so as to provide the same output for the same amount of received light energy. Typical light emitting diodes are identified as Fairchild Semiconductor EPA104 components. In the schematic, the upper phototransistor 117 represents the outer phototransistor while the lower phototransistor 115 represents the inner phototransistor with respect to their positions on the end of the tone arm in relation to the outer edge of the phonograph record. The light received by the inner phototransistor 115 provides a voltage on line 131 generated across the 1k load resistor 133. The outer phototransistor 117 provides a voltage on line 135 generated across a 1k resistor 139. As described previously, the output of the two phototransistors will be approximately equal when the light being received is reflected from the same type of record surface, i.e., sound track portion or land area portion, so that subtracting the one from the other will cancel the two components. However, upon arrival of the land area reflection to the inner phototransistor, there is a large change in output of phototransistor 115 which results in a readily recognizable differential between the two signals.

The output of phototransistor 117 is applied to a non-inverting amplifier 141, again one of four present in an LM324 quad op-amp. Line 135 is connected by a 50k resistor 143 to pin 5, the non-inverting side of the amplifier 141. Feedback is applied from the output pin 7 through a 120k resistor 145 to the inverting input, pin 6 of the amplifier 141. Pin 6 is connected to a 100k resistor 149 to ground. Therefore, the output from the amplifier on line 151 is approximately two times that supplied by the phototransistor 117. Line 151 is connected through a 100k resistor 153 to the inverting input, pin 9, of a second amplifier 154. The non-inverting input terminal, pin 10, of the amplifier 154 is connected through a 50k resistor 157 to line 131, the output of the inside phototransistor 115. In this manner, a difference signal is taken between the two phototransistor outputs. The output at pin 8 is the difference between the input at pin 10 minus the input at pin 9. Typically, the output of amplifier 154 will be approximately 160 millivolts when the stylus is in the down position and approximately 170 millivolts when the stylus is in the up position. The output of amplifier 154 on line 159 is applied to the noninverting input pin 12 of a linear amplifier 161. The amplifier 161 includes feedback capacitor 163 connected in parallel with a 75k feedback resistor 165 and a variable 500k resistor 167. The resistor 167 is adjusted so that the overall gain of the amplifier 161 is between 20 and 30. Capacitor 163 serves to roll off high frequency noise disturbances. An output on line 169 of amplifier 161 exists only when there is an unbalanced signal between the phototransistor 115 and 117, when the inner phototransistor 115 is receiving light reflected by a land area. Normally, when the two phototransistors 115 and 117 are receiving light reflected from a recorded portion, the output of amplifier 161 is approximately at ground. Therefore, a diode 171 conneced to line 169 disconnects the remainder of the circuit when the two phototransistors 115 and 117 are balanced. When an unbalanced signal is applied, the output on line 169 rises towards 5 volts, or $V_{CC}$, and charges a one micro-farad capacitor 173. This positive voltage is applied to the inverting side, pin 2, of a fourth operational amplifier 175. Again, the amplifier 175 is connected as a comparator with the non-inverting input, pin 3, connected to the junction between a 330k resistor 177 and a 390k resistor 179. Therefore, approximately 2½ volts are applied to pin 3 and when the input at pin 2 goes above 2.5 volts, the threshold of the comparator 175, the output at pin 1, switches from 3.8 volts to ground.

In passing over a land area, since the light emitting diode 119 is being pulsed, the output of the comparator will develop more than one and perhaps three or four apparent land area commands. This signal is inadequate to drive the logic portion as previously described. Another 555 timer 183 is connected to pin 1 by line 181 so that it will start timing only after the comparator has returned to 3.8 volts. The length of time during which the timer 183 will output one pulse, a hig level pulse on line 185 is determined by the 47k resistor 187 and the series connected 25k resistor 189. These two resistors in conjunction with a 10 micro-farad capacitor 191 determine the length of time during which the timer 183 will be high once it has been triggered by the output comparator. Pin 3 is connected by line 185 to the logic system, as described in the above referenced application, to indicate that a land area has been encountered.

Again, as described above, when the stylus is in its up position so that the tone arm is sweeping across the record, the circuit may be adjusted slightly since the sensor is moving across the record surface at a much faster rate. To adjust the circuit, a transistor 192 is connected between a 330k resistor 193 and ground. The base of transistor 192 is connected by a line 195 to the solenoid control circuitry as described in the previous applicaton to a point, the collector of $Q_4$, so as to provide approximately 10 volts to the base of the transistor 192 when the logic system provides a lift command to move the stylus to the up position. When this voltage occurs, transistor 192 saturates so that its collector drops essentially to ground thereby connecting the 330k resistor to ground. The time constant of the original combination including the one micro-farad capacitor 173 and the one megohm resistor 197 is therefore shortened by a factor of approximately 3 to 1 which is sufficient to accommodate the more rapid variations in the signal because of the faster tone arm traverse movement. Thus, the differential system 111 provides an alternate method of detecting land areas on a record surface by comparing the reflectivity of the record surface immediately prior to the stylus with that immediately following the stylus on its movement inwardly across a record surface.

An alternate type of differential system is shown in block diagram in FIG. 6. In this alternate embodiment, a pair of light emitting diodes $D_1$ and $D_2$ are mounted on either side of a single phototransistor 199 in a similar manner as shown in FIG. 4 above. In this embodiment, the light emitting diodes $D_1$ and $D_2$ are alternatively pulsed to provide reflected light from the record surface to the phototransistor 199. Referring to the block diagram of FIG. 6, an oscillator 201 provides a square wave output 203 as shown in the top of FIG. 7. This output is connected to a divide by two flip-flop 205 providing an output Q and a second output $\bar{Q}$. The Q and $\bar{Q}$ signals are shown in a time relationship with one another and the square wave 203 in in the bottom of FIG. 7. In this case, the Q signal saturates a transistor 207 connected between $D_1$ and ground to illuminate $D_1$ when the signal is high. Likewise, the $\bar{Q}$ signal is connected to a second transistor 209 which saturates to illuminate $D_2$ when $\bar{Q}$ is high. The light emitting diodes alternately illuminate the phototransistor 199 as represented by arrows 211 and 213. The output voltage developed across a load resistor 215 is applied to two parallel circuits.

Referring to the right of FIG. 6, the voltage developed across resistor 215 as a result of a light pulse from light emitting diode $D_1$ is passed by field effect transistor 217, turned on by logic signal Q. As a result, the output of the phototransistor 199 is applied to a capacitor 219. This field effect transistor 217 and capacitor 219 forms a sample-and-hold circuit. Likewise, a second field effect transistor 221 in the lower circuit has its gate connected to $\bar{Q}$ so as to provide a second sample-and-hold circuit, charging capacitor 223 to the output of the phototransistor 199 when $\bar{Q}$ is high. The DC outputs of the respective circuits are then compared to one another as above described with referece to FIG. 3 to provide a reliable land sensor. Again, this system is insensitive to absolute amplitude reflections and does not require matched phototransistors as described above. The output of the light emitting diodes $D_1$ and $D_2$ can easily be adjusted and balanced by adusting resistors 227 and 229.

The three above systems, the land sensor system using a DC light source, and the two differential systems are designed for use with a programmable phonograph record changer such as that described in the incorporated patent application. All of the mechanical elements therein as well as the logic circuitry and the tone arm lift and sweep circuitry is shown in said copending application and need not be described again herein. Additionally, the 555 timer as shown in FIG. 3 could be incorporated in the DC illuminator circuit of FIG. 1 as well as in the parent application without departing from the present invention.

The foregoing detailed description has been given for clearness of understanding only and no unnecessary limitations are to be understood therefrom as some modificatons will be obvious to those skilled in the art.

We claim:
1. A programmable phonograph device providing automatic sound track selection from a record having a plurality of sound track bands spaced apart by a plurality of intraband land areas, comprising:
   an electro-optic scanner including a light emitting diode and two phototransistors;
   land sensing means including a differential amplifier having first and second inputs, means for supplying a first signal corresponding to the current flowing in one of said phototransistors to said first input, means for supplying a second signal corresponding to the current flowing in the other one of said phototransistors to said second input, and means for deriving an output signal proportional to the difference between said first and second signals at the output of said differential amplifier, and
   programable control logic means controlled by said output signal for storing a predetermined selection of sound track bands to be played and positioning the stylus on the record to play said preselected record bands.

2. The programmable phonograph device of claim 1 wherein said electro-optic scanner includes a light emitting diode and said phototransistors are mounted on opposite sides thereof on the phonograph tone arm so that the light emanating from the light emitting diode is reflected from the surface of the record to both of said phototransistors.

3. The programmable phonograph device of claim 1 wherein the land sensing means includes an oscillator for pusling said light emitting diode at a predetermined frequency to generate a predetermined amount of light to be directed toward the record surface.

4. The programmable phonograph device of claim 1 wherein said phototransistors are balanced to provide substantially equal outputs for equal amounts of received reflected light energy.

5. The programmable phonograph device of claim 4 wherein said light emitting diode and phototransistors are mounted in generally transverse alignment with respect to the phonograph tone arm so that, as the tone arm traverses a record surface, exposure of one of said phototransistors to the light reflected from a land area results in an output from said differential amplifier means, said output indicating the presence of a land area below said sound stylus.

6. A programmable phonograph device providing automatic sound track selection from a record having a plurality of sound track bands spaced apart by a plurality of intraband land areas, comprising:
- an electro-optic scanner including a photodetector and two light emitting diodes;
- land sensing means connected to said electro-optic scanner including amplifier means for comparing the light energy from each of said light emitting diodes reflected by the record surface for detecting the presence of a land area below the stylus; and
- programmable control logic means connected to said land sensing means for storing a predetermined selection of sound track bands to be played and positioning the stylus on the record to play said preselected record bands.

7. The programmable phonograph device of claim 6 wherein said electro-optic scanner includes a phototransistor mounted between the light emitting diodes in generally transverse alignment with respect to the longitudinal axis of the phonograph tone arm so that the light emanating from the light emitting diodes is reflected from the surface of the record to the phototransistor.

8. The programmable phonograph device of claim 7 wherein the land sensing means includes an oscillator for alternately pulsing the light emitting diodes at a predetermined frequency to generate a predetermined amount of light to be reflected toward the phototransistor from different portions of the record surface.

9. The programmable phonograph device of claim 6 including means for balancing the amount of light energy emanated by the light emitting diodes to provide substantially equal light outputs to be directed toward the record surface whereby the phototransistor provides substantially equal output for successive pulses for equal amounts of reflected light.

* * * * *